United States Patent [19]

Jorgensen et al.

[11] Patent Number: 5,191,156
[45] Date of Patent: Mar. 2, 1993

[54] DRILL STRING ENCLOSURE

[75] Inventors: Douglas K. Jorgensen; Douglass J. Kuhns; Otto Wiersholm; Timothy A. Miller, all of Idaho Falls, Id.

[73] Assignee: The United States of Americas as represented by the United States Department of Energy, Washington, D.C.

[21] Appl. No.: 868,143

[22] Filed: Apr. 14, 1992

[51] Int. Cl.⁵ .............................................. B09B 1/00
[52] U.S. Cl. .................................... 588/249; 405/128
[58] Field of Search ............... 405/128, 129, 258, 263, 405/266, 267, 228, 227; 166/308; 175/66, 206; 588/249

[56] References Cited

U.S. PATENT DOCUMENTS

| | | | |
|---|---|---|---|
| 216,970 | 7/1879 | Parks | 405/228 X |
| 510,264 | 12/1893 | Kash | 405/228 |
| 2,122,517 | 7/1938 | Curtis | 175/206 X |
| 3,922,869 | 12/1975 | Wisotsky | 405/228 |
| 4,257,720 | 3/1981 | Ostgaard | 405/228 X |
| 4,444,280 | 4/1984 | Howeth | 175/206 |
| 4,834,194 | 5/1989 | Manchak | 405/128 X |
| 5,127,765 | 7/1992 | Millgard | 405/128 |

*Primary Examiner*—Dennis L. Taylor
*Attorney, Agent, or Firm*—Tyrone Davis; Thomas G. Anderson; William R. Moser

[57] ABSTRACT

The drill string enclosure consists of six component parts, including; a top bracket, an upper acrylic cylinder, an acrylic drill casing guide, a lower acrylic cylinder, a bottom bracket, and three flexible ducts. The upper acrylic cylinder is optional based upon the drill string length. The drill string enclosure allows for an efficient drill and sight operation at a hazardous waste site.

11 Claims, 4 Drawing Sheets

DRILL STRING ENCLOSURE

CONTRACTUAL ORIGIN OF THE INVENTION

The United States Government has rights in this invention pursuant to Contract No. DE-AC07-76ID01570 between the United States Department or Energy and EG&G Idaho,INC.

BACKGROUND OF THE INVENTION

Between 1950 and 1970 the Department of Energy's Rocky Flats Plant generated contaminated waste, which was buried at the Idaho National Engineering Laboratory. This waste must now be retrieved and sent to a permanent disposal site. During retrieval the main contaminates to be controlled are compounds of plutonium and americium, and other volatile organic and inorganic substances. Since these substances are small sized, and extremely mobile, airborne concentrations must be kept to a minimum to effectively eliminate personnel uptake during retrieval operations. This invention relates to a drill string enclosure which is required to prevent release of contaminates and allows maximum visibility for the workers during drilling and sampling of hazardous waste sites. The drill string enclosure consists of six component parts a top bracket, an upper acrylic cylinder, an acrylic drill casing guide, a lower acrylic cylinder, a bottom bracket, and three flexible ducts.

Prior to the development of the drill string enclosure, the primary means for the control of airborne contaminate particles of plutonium and americium was the control of the moisture content of the soil in and around the dig site. The addition of moisture to the surface soil of a dig is a well known method of dust control used by many industries. However, effective monitoring and control of the airborne particles by moisture addition alone cannot, as a sole means of containment, meet the stringent requirements imposed by the federal and state governments for hazardous waste sites. Additionally, coverings and air locks which reduce the amounts of contaminates released are more costly and hinder the visibility of the workers during drilling operations. The present invention presents a novel enclosure which allows for maximum visibility of the drill site with a minimum release of contaminates into the atmosphere.

SUMMARY OF THE INVENTION

The drill string enclosure consists of six component parts, including; a top bracket, an upper acrylic cylinder, an acrylic drill casing guide, a lower acrylic cylinder, a bottom bracket, and three flexible ducts. The upper acrylic cylinder is optional based upon the drill string length. The drill string enclosure allows for an efficient drill and sight operation at a hazardous waste site. When drilling at a particular level is finished a new drill string can be added with a minimum amount of exposure to contaminates. The string is introduced through a port in the drill string guide. The port has a bag attached by a clamp. This allows the string to be inserted through the port and contact with the atmosphere to be cut off. A vacuum hose attached to the lower acrylic cylinder helps to reduce the amount of airborne contaminates that may escape when inserting the drill string in the port. The lexan or acrylic sight cylinders allow the string to be guided securely into place. When the new drill string is in place the drilling may continue at the new level.

It is an object of the invention to provide an effective contaminate containment system for drilling hazardous waste sites.

It is another object of this invention to provide an inexpensive means to contain contaminants, during drilling, while allowing optimum visibility of the drill site.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the invention may comprise a top bracket, an upper acrylic cylinder, an acrylic drill casing guide, a lower acrylic cylinder, a bottom bracket, and three flexible ducts.

BRIEF DESCRIPTION OF THE DRAWINGS

The accompanying drawings, which are incorporated in and form part of the specification, illustrate an embodiment of the present invention and together with the description, serve to explain the principles of the invention. In the drawings.

DETAILED DESCRIPTION OF THE INVENTION

Figure 1:
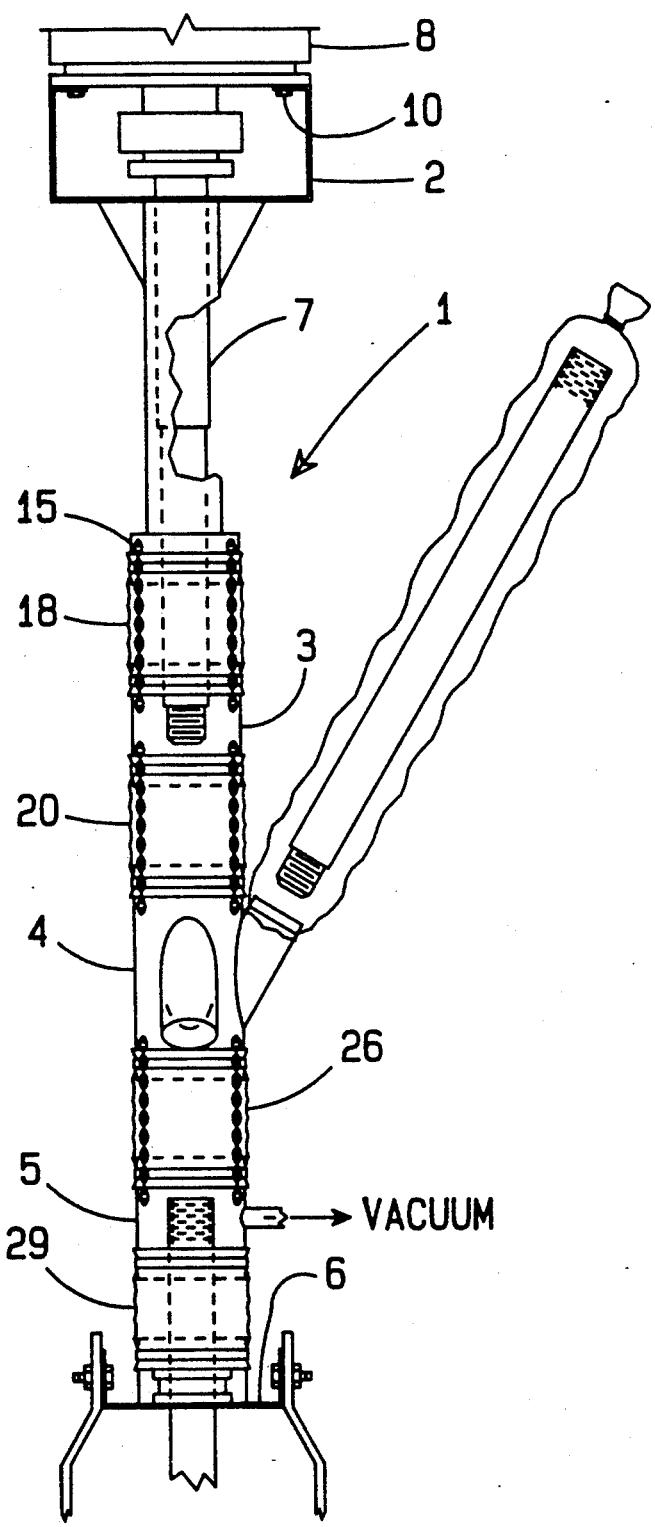
FIG. 1 shows an embodiment of the invention.
Figure 2:
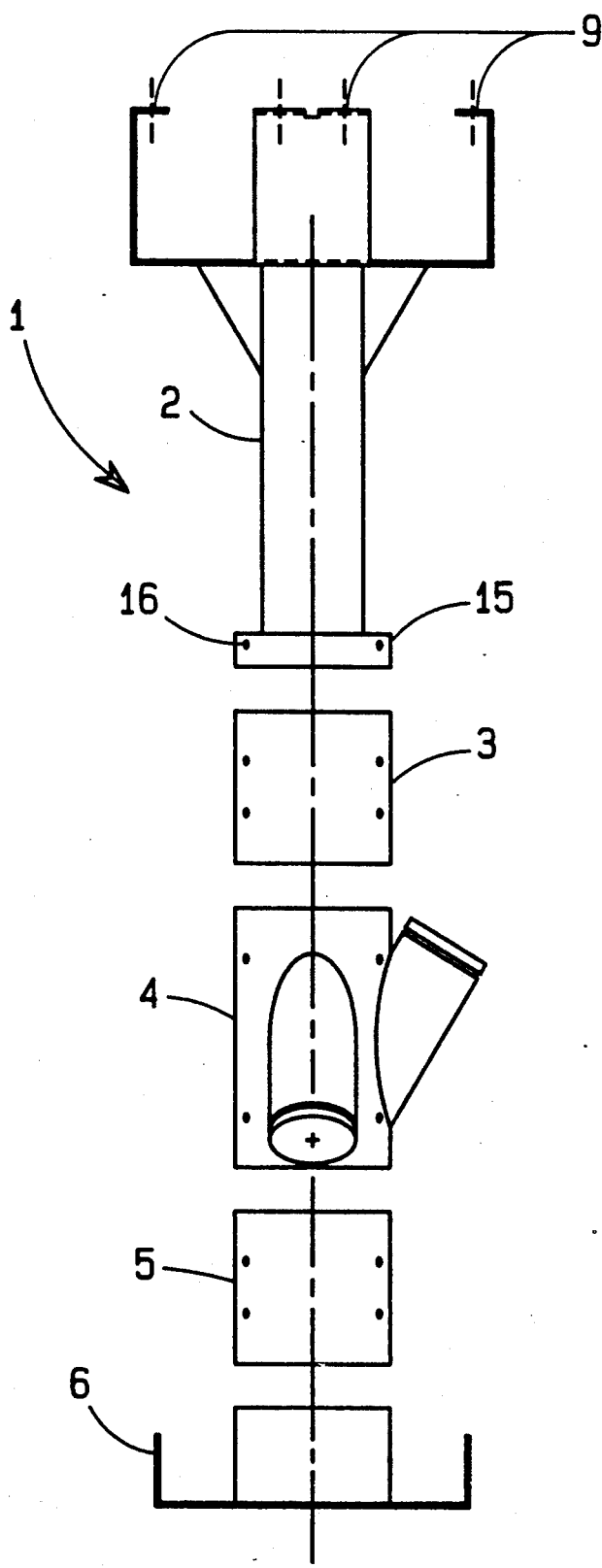
FIG. 2 shows an exploded view of some of the major components of the invention.

Referring to FIGS. 1 and 2, the drill string enclosure 1 comprises a top bracket 2, connected to an upper acrylic cylinder 3. The drill casing guide 4 is attached to either the upper acrylic cylinder 3 or the top bracket 2 if the upper acrylic cylinder is not in use. A lower acrylic cylinder 5 connects to a bottom bracket 6 on one end, and the other end- is attached to the drill casing guide 4.

Figure 3:
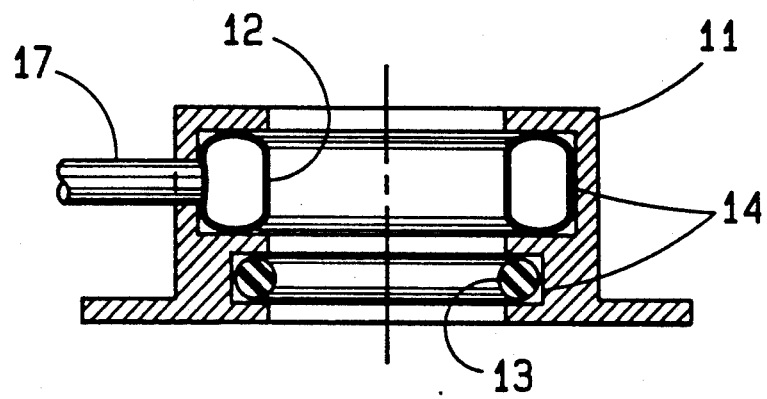
FIG. 3 shows a detailed crossectional view of the upper retainer ring.

In a preferred embodiment of the invention, the top bracket 2 is comprised of carbon steel or other comparable industrial grade steel. The bracket 2 is slipped over the drill steel 7 and bolted to the sonic drive head 8 on the drill rig using six bolts 10 on the three flared ends 9 of the bracket 2. The base 15 of the top bracket 2 is fitted with a cylindrical aluminum retainer 11. As shown in FIG. 3, the aluminum retainer 11 holds an air seal 12 and an O-Ring 13. The air seal 12 and O-Ring 13 are held in place using machined grooves 14 for each component. The air seal 12 is further secured with a silicone sealant. The retainer 11 is held in the top bracket base 15 with bolts 16 and silicon sealer. The air seal 12 is inflated by means of an air hose 17 that runs through the steel and aluminum retainer 11. Attached to the base 15 of the top bracket 2 is flexible ducting 18. The flexible ducting is attached to the bracket 2 by a hose clamp 19. The other end of the flexible ducting 18 is attached to the acrylic drill casing guide 4.

Figure 4:
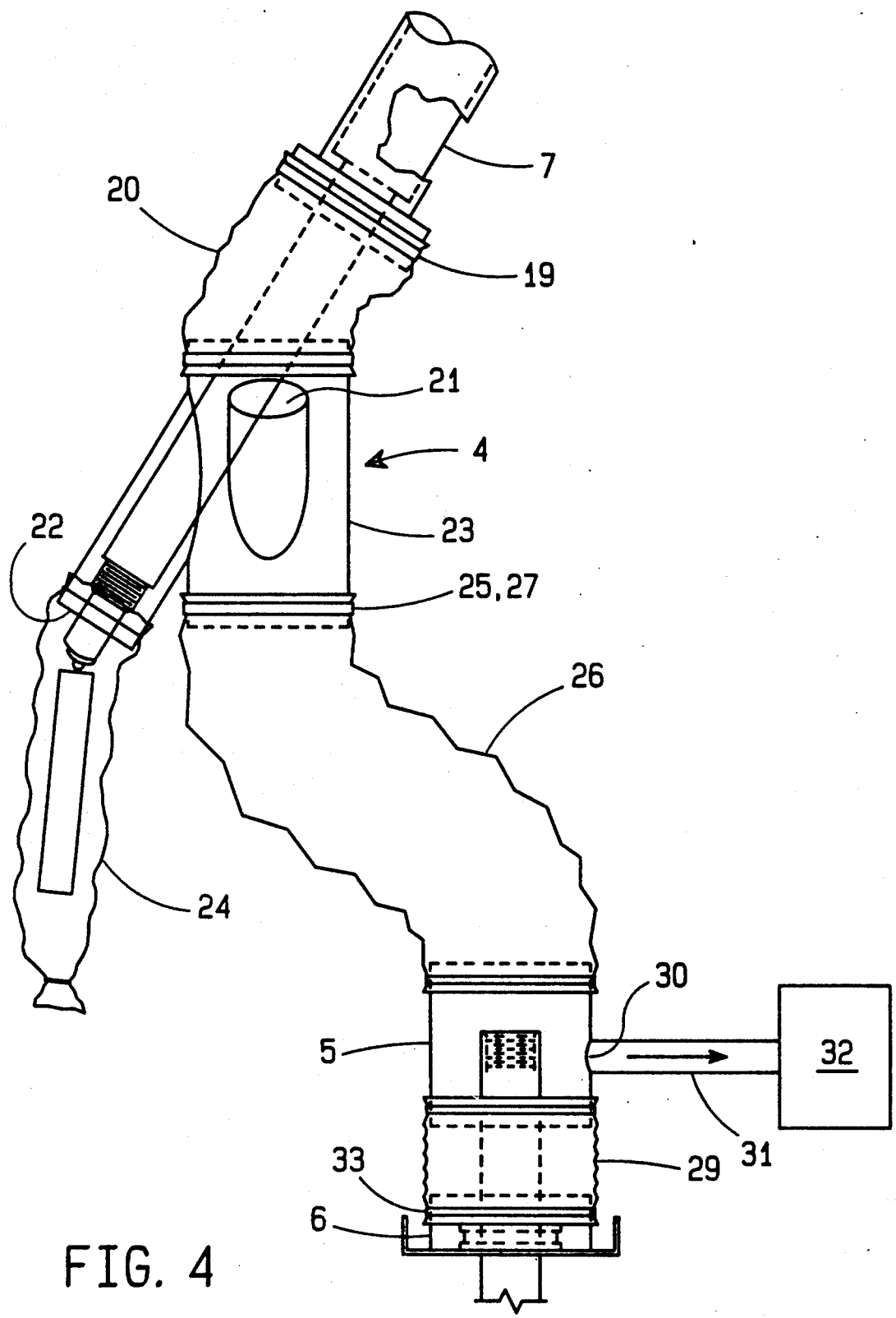
FIG. 4 shows another embodiment of the invention.

The upper acrylic cylinder 3 connects to the ducting 18 and is attached to it at the top bracket 2 and another ducting section 20 attaches to the opposite end of the cylinder 3 and extends up to the casing guide 4. FIG. 4 shows, the acrylic drill casing guide 4 having two acrylic ports 21 and 22 attached to a main cylinder 23 via a strong epoxy glue. The ends of the ports 21 and 22 are grooved in two places for ease in attachment of a sample bag 24 using a slip tie. The base of the casing guide 25 is again attached to flexible ducting 26 with a hose clamp 27, this ducting is attached to the lower acrylic viewing cylinder 5, and another section of ducting 29 is attached to the base 28 of the lower cylinder 5, thus completing the system.

Figure 5:
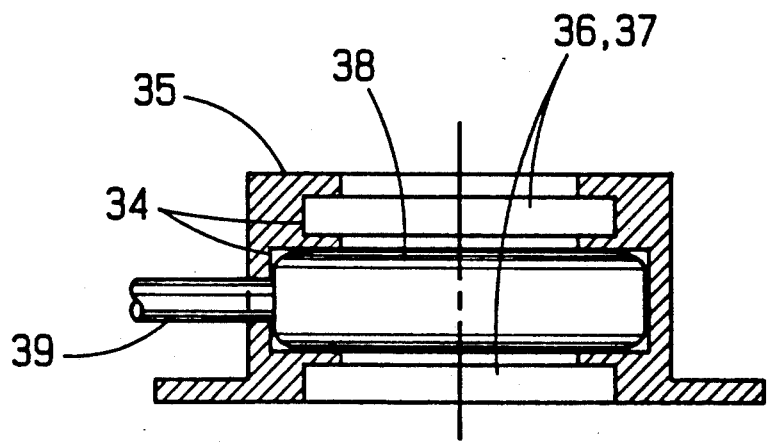
FIG. 5 shows a detailed crossectional view of the lower retaining ring.

A hole 30 has been machined into the lower acrylic cylinder 5 in which a hose 31 is attached leading to a HEPA vacuum 32. The vacuum 32 produces a negative pressure inside the enclosure to further ensure containment of airborne contaminants. The last section of ducting 29 is attached to the bottom bracket 6 with a standard hose clamp 33. The bracket 6 is carbon steel or other suitable material and is bolted to the drill rig above the breakout jaws. Inside the bottom bracket 6 is an aluminum retainer 35. As shown in FIG. 5, contained in the retainer 35 are two brush seals 36, 37, and another air seal 38. The attachment of the retainer 35 to the bottom bracket 6 is identical to the base of the top bracket 2. Brush seals 36, 37, and air seal 38 are also held in place using grooves 34 machined into the aluminum retainer 35. The air seal 38 is further secured in place using a silicone sealant. Adjustable chains are attached from the top bracket 2 to bolts mounted in the acrylic casing guide 4. Three chains move the entire enclosure vertically and hold the enclosure in place.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A drill string enclosure comprising:
   a top bracket having an upper and lower end;
   a first flexible cylinder member connected at one end to said lower end of said top bracket;
   means for guiding drill casings attached to said other end of said first flexible cylinder member;
   a second flexible cylinder member connected at one end to said means for guiding drill casings;
   a lower cylinder member attached to the other end of said second flexible cylinder member;
   a third flexible cylinder member connected at one end to said lower cylinder member; and
   a bottom bracket attached to the other end of said third flexible cylinder member.

2. A drill string enclosure as recited in claim 1 wherein said top bracket further comprising:
   a top section, said top section including means for connecting said top bracket to a drill rig, and wherein said means includes three flared ends;
   a cylindrical mid-section; and
   a bottom base section, said bottom base section including a retainer ring.

3. A drill string enclosure as recited in claim 2, wherein said retainer ring comprises:
   means for sealing contaminates within said drill string enclosure preventing release of said contaminates into the atmosphere.

4. A drill string enclosure as recited in claim 3, wherein said bottom bracket comprises:
   a retainer ring, said retainer ring including means for sealing contaminates within said drill string enclosure preventing release of said contaminates into the atmosphere.

5. A drill string enclosure as recited in claim 4, wherein said means for guiding drill casing comprises:
   a hollow cylindrical member, including at least one port for introducing additional drill string members into said drill string enclosure while allowing a minimum release of contaminates into the atmosphere.

6. A drill string enclosure as recited in claim 5, wherein said means for sealing contaminates in said top bracket comprises:
   a hollow aluminum ring, having a first and second groove etched around the inner periphery of said hollow aluminum ring;
   an air seal seated in said first groove; and an o-ring seated in said second groove.

7. A drill string enclosure as recited in claim 6, wherein said means for sealing contaminates in said bottom bracket comprises:
   a hollow aluminum ring, having a first and second groove etched around the inner periphery of said hollow aluminum ring;
   an air seal; and
   two brush seals seated within said first and second grooves of said hollow aluminum ring.

8. A drill string enclosure as recited in claim 7, wherein said lower cylindrical cylinder includes a means for providing a negative pressure differential within said drill string enclosure.

9. A drill string enclosure as recited in claim 8, wherein said three flared ends and mid-section are comprised of carbon steel.

10. A drill string enclosure as recited in claim 8, wherein said upper cylindrical cylinder, lower cylindrical cylinder, and means for guiding drill casing is comprised of an acrylic.

11. A drill string enclosure as recited in claim 8, wherein said lower cylindrical cylinder includes a means for providing a negative pressure differential comprises a vacuum, having the ability to remove small airborne contaminates within said drill string enclosure.

* * * * *